Patented July 27, 1954

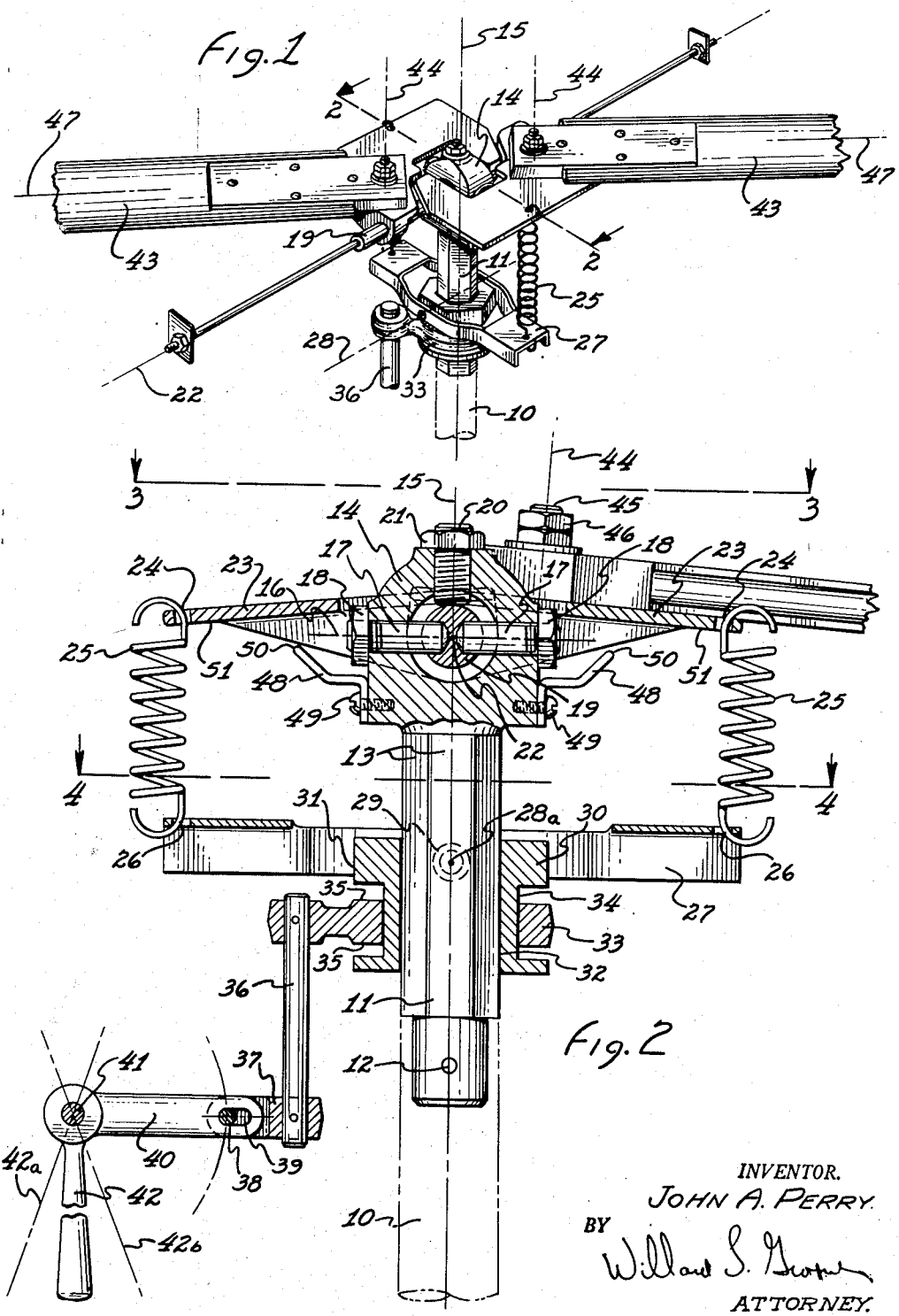

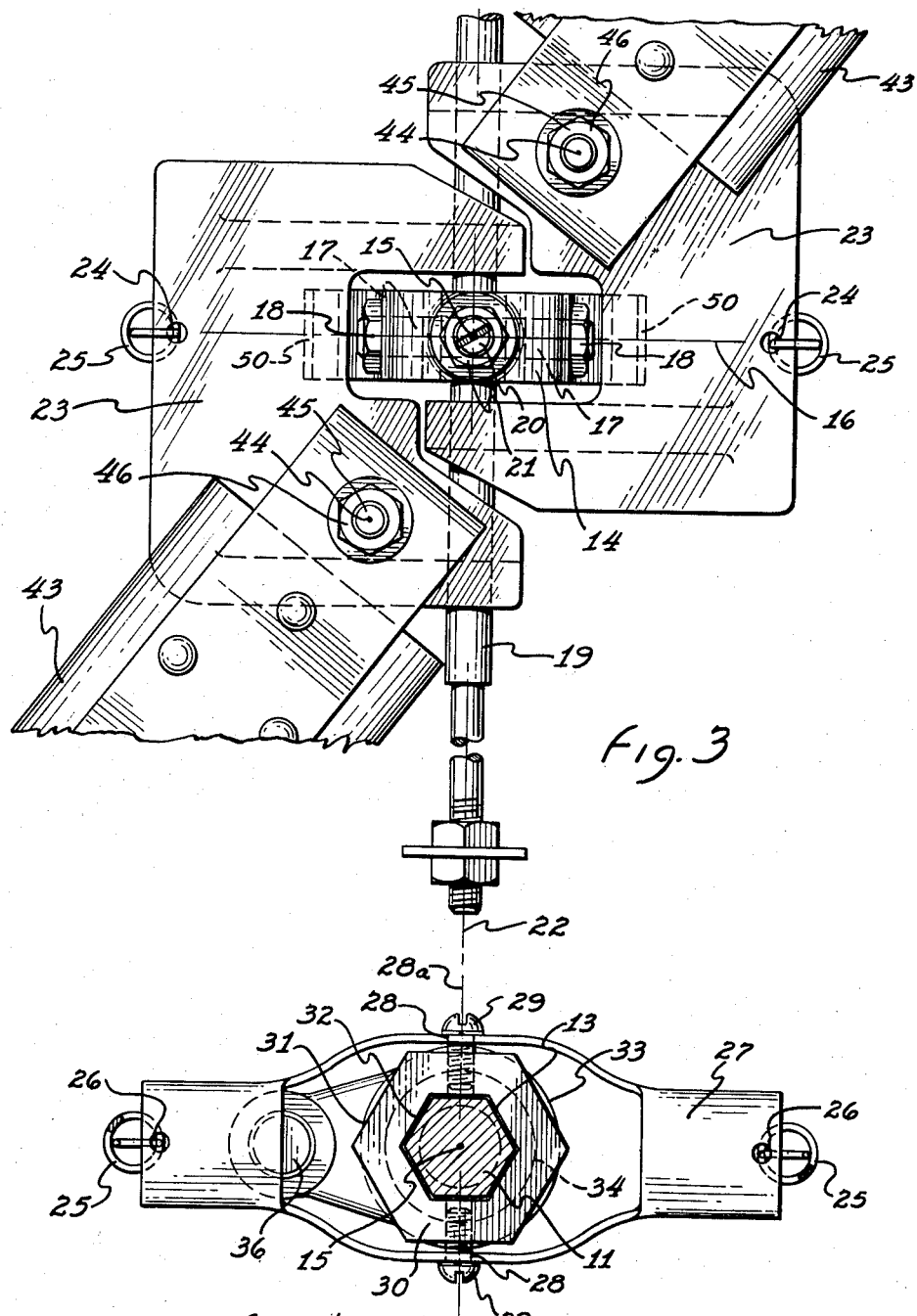

2,684,722

UNITED STATES PATENT OFFICE 2,684,722

HELICOPTER ROTOR STRUCTURE

John A. Perry, Phoenix, Ariz.

Application May 22, 1952, Serial No. 289,323

5 Claims. (Cl. 170—160.25)

This invention pertains to improvements in airplane structures and is more particularly directed to an improved helicopter rotor structure.

One of the objects of this invention is to provide a helicopter rotor structure having rotor blades which are pivotally mounted on the main hub structure and which pivotal movement of the blades may be set at various different angles relative to the disc of rotation for varying their angle of attack and to also provide resilient means to allow freedom of said pivotal movement together with control means for said resilient means to limit the overall floating pivotal movement to certain predetermined ranges of angle of attack.

Still another object of this invention is to provide an improved helicopter rotor structure having a plurality of pivotally mounted blades adapted to adjustment on said pivotal mountings to vary their angle of attack while at the same time providing means for automatically allowing limited freedom of said pivotal movement either side of predetermined set angles of attack for the blades.

Still another object of this invention is to provide an improved helicopter rotor structure in which there is provided a vertical drive shaft inclinable from vertical position for steering the craft, a universal joint mounting for a substantially horizontally disposed counterweight shaft, and wings pivotally mounted about the axis of said counterweight shaft for movement so as to vary their angle of attack relative to the disc of rotation of the blades, and then to provide means for yieldingly restricting said pivotal movement of the blades and for further repositioning the location of said limited pivotal movement at predetermined positions.

It is also an object of this invention to provide an improved helicopter rotor structure having full floating pivotally mounted blades together with manually operable control means for reorienting the location of pivoting of said blades for predetermined general positions of angle of attack while at the same time allowing freedom of pivotal movement of said blades within certain ranges.

Further features and advantages of this invention will appear from a detailed description of the drawings in which:

Fig. 1 is a perspective view of an improved helicopter rotor structure incorporating the features of this invention.

Fig. 2 is an enlarged vertical section on the line 2—2 of Fig. 1.

Fig. 3 is a plan view indicated by the line 3—3 in Fig. 2.

Fig. 4 is a section on the line 4—4 of Fig. 2.

As illustrative of one embodiment of this invention there is shown a helicopter rotor structure including the main drive shaft 10 which is connected to the drive motor for the aircraft. The shaft 10 may be rocked and tilted as in conventional practice for the normal steering of the craft and to the upper end of the shaft 10 there is fixed a shaft 11 by suitable pin means such as 12. The shaft 11 is formed with a hexagonal surface 13 and on the upper end thereof there is formed an integral eye portion 14, the main rotation of the shafts 10 and 11 being around the axis 15 which is disposed in normal vertical flight in a substantially vertical position.

Extending in a substantially horizontal direction for rocking movement about an axis 16 is the transverse trunnions 17 journaled in the eye member 14 and retained against axial shifting movement by suitable lock nuts 18 threadedly mounted on the outer ends of the trunnion shafts 17. The inner ends of the trunnion shafts 17 are securely fixed to the counterweight and wing pivot shaft 19 while a suitable stop screw 20, having a jam nut 21, limits the rocking movement of the shaft 19 on its trunnions 17 in the eye 14.

Pivotally mounted for rocking motion on the shaft 19 about the axis 22 of the shaft 19 are the wing support hinge members 23 to the outer ends of which are connected at 24 the tension springs 25 of open coil construction which terminate at their lower ends at the points 26 with the yoke member 27 which in turn is journaled on suitable bearings 28 on the supporting screws 29 threadedly mounted in the portion 30 of the shifter spool member 31 having a hexagonal bore 32 slidingly fitting the hexagonal portion 13 of the shaft 11.

The shifter spool 31 may be actuated in vertical movement on the shaft 11 by the shifter fork 33 operating in the annular slot 34 of the spool and having faces 35 which are narrower than the annular slot 34 so as to provide lost motion relative axial movement between the fork member 33 and the shifter spool 31. The fork is fixed to a shifter rod 36 which has a shifter link 37 connected through a pin 38 and an elongated slot 39 in the bell crank lever 40 which in turn is pivotally mounted at 41 and has a control lever 42 for manual manipulation thereof by the pilot during flight.

Each of the rotor blades 43 are also pivotally mounted about an axis 44 on the hinge members 23, preferably by means of the bolts 45 and lock nuts 46 so as to be frictionally restricted against swinging movement about the axis 44 but sufficiently free to adjust themselves to proper position or, the wings may be clamped to the desired angular position of the main axis 47 of the wing or blades relative to the axis 22 of pivotal mounting of the blades on the shaft 19. The downward swinging movement of the hinge members 23 and therefore the rotor blades is preferably limited by a stop means 48 fixed to the eye member 14 by suitable screws 49 and having abutment edges 50 which are adapted to engage the under surfaces 51 of the hinge members 23 to limit their downward position when the main drive shaft 10 and the shaft 11 are de-energized and not rotating.

The operation of the device is as follows: As the pilot is to take off, the shafts 10 and 11 are rotated at the necessary speed from the driving motor and the control lever 42 is moved toward the position 42a which causes the shifter spool 31 and the yoke member 27 to be moved downwardly which causes downward tension in the springs 25 and moves the hinge members 23 downwardly to increase the angle of attack of the blades 43 to begin the vertical upward ascent of the craft. By moving the lever in the opposite direction toward the position 42b, the operator enables the blades to move to a position of decreased angle of attack to hovering position or for descent of the craft. Directional control of the craft is obtained by the inclination of the axis 16 of the shafts 10 and 11 in a conventional manner. It is important to note that the yoke 27 is pivotally mounted about the axis 28a which is parallel to the axis 22 of pivotal movement of the hinge members 23 for the wings. As a result the structure is such that the universal mounting of the shaft 19 carrying the hinge members together with the yoke member 27 mounted as recited provides a completely universal and free moving mounting for any relative position of the shaft 19 so that the pilot may manipulate the lever 42 under all conditions to allow the desired change in the angle of attack to take place in the blades under flight conditions. The spring mountings at 24—26 for the springs 25 are also positioned in a plane perpendicular to the axes 22 and 28 and passing thru the axis 16 of the trunnion shafts 17 so that the sidewise swinging relative movement of the shaft 19 has no effect on changing the length or tension in the spring member 25 relative to the yoke member 27. During normal flight the wings may have very limited self effected pivotal motion about the axis 22 so that the springs 25, yoke 27 and shifter spool 30 are located at a substantially intermediate position relative to the shifter yoke 33, as best seen in Fig. 2, so that the wings operate under normal free floating characteristics. The pilot by moving the lever 42 to either of the positions indicated may stress the spool upwardly or downwardly as desired for certain types of flying conditions, but the wing structures may still float within limited restricted character under the influence of the springs 25 which can act in both directions since they are of open coil construction. Further, by means of this arrangement no violent sudden changes are effected in the disc of rotation for the blades in changing the angle of attack of said blades. Thus a smooth fool proof operating mechanism is provided which is normally self floating and effects automatically the free pivotal motion for the wings about the axis 22 but which may be manipulated to change the angle of attack of said wings or rotor blades for desired climbing or diving or other control of the plane as required.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In a helicopter rotor structure having a vertical drive shaft, a transverse shaft pivotally mounted on said vertical drive shaft for rocking movement about a horizontal axis passing thru the axis of rotation of said vertical drive shaft and angularly disposed relative to the axis of said horizontal shaft, a plurality of rotor blade hinge members pivotally mounted for rocking movement about the axis of said transverse shaft, counterweight means on the outer ends of said transverse shaft, rotor blade members mounted on said hinge members with the axes of said rotor blade members extending in an angularly related direction relative to the axis of said transverse shaft, means movable axially on said drive shaft for simultaneously yieldingly shifting said hinge members to different pivotal positions on said transverse shaft, a yoke member, a shifter spool vertically slidable and driven by said vertical drive shaft, means for pivotally mounting said yoke member on said spool for rocking movement about an axis parallel to the axis of said transverse shaft and the pivotal movement of said hinge members passing thru the axis of said vertical drive shaft, and resilient means interconnecting the outer ends of said yoke member with said hinge members.

2. In a helicopter rotor structure having a vertical drive shaft, a transverse shaft pivotally mounted on said vertical drive shaft for rocking movement about a horizontal axis passing thru the axis of rotation of said vertical drive shaft and angularly disposed relative to the axis of said horizontal shaft, a plurality of rotor blade hinge members pivotally mounted for rocking movement about the axis of said transverse shaft, counterweight means on the outer ends of said transverse shaft, rotor blade members mounted on said hinge members with the axes of said rotor blade members extending in an angularly related direction relative to the axis of said transverse shaft, means movable axially of said drive shaft for simultaneously yieldingly shifting said hinge members to different pivotal positions on said transverse shaft, a yoke member, a shifter spool vertically slidable and driven by said vertical drive shaft, means for pivotally mounting said yoke member on said spool for rocking movement about an axis parallel to the axis of said transverse shaft and the pivotal movement of said hinge members passing thru the axis of said vertical drive shaft, resilient means interconnecting the outer ends of said yoke member with said hinge members, a shifter fork engaging said spool, a lost motion connection between said shifter fork and said spool, and a control lever actuable by the pilot of the aircraft for moving said shifter fork and shifter spool in vertical movement.

3. A helicopter rotor structure comprising a vertical drive shaft, a shifter spool slidably and drivably mounted on said vertical drive shaft, a yoke member, means for pivotally mounting said yoke member on said shifter spool for rocking movement about a horizontal axis, a counterweight shaft having an axis disposed parallel to the axis of pivotal mounting of said yoke member, means for mounting said counterweight shaft for rocking movement about an axis at right angles to the axis of pivotal rocking movement of said yoke member on said drive shaft, counterweight means on the outer ends of said counterweight shaft, a plurality of hinge members pivotally mounted for rocking movement about the axis of said counterweight shaft, an open coil tension spring interconnecting the outer end of each of said hinge members with each outer end of said yoke member, and rotor blade means mounted on said hinge members.

4. A helicopter rotor structure comprising a vertical drive shaft, a shifter spool slidably and drivably mounted on said vertical drive shaft, a yoke member, means for pivotally mounting said yoke member on said shifter spool for rocking movement about a horizontal axis, a counterweight shaft having an axis disposed parallel to the axis of pivotal mounting of said yoke member, means for mounting said counterweight shaft for rocking movement about an axis at right angles to the axis of pivotal rocking movement of said yoke member on said drive shaft, counterweight means on the outer ends of said counterweight shaft, a plurality of hinge members pivotally mounted for rocking movement about the axis of said counterweight shaft, tension spring means interconnecting the outer ends of said hinge members with the outer ends of said yoke member, rotor blade means mounted on said hinge members, and stop means interacting between said vertical drive shaft and said hinge means to limit downward swinging movement of said hinge means and rotor blades.

5. A helicopter rotor structure comprising, a vertical drive shaft, a counterweight and wing pivot shaft pivotally mounted on said drive shaft for swing movement about a horizontal axis, rotor blade support hinge members pivotally mounted on said counterweight and wing pivot shaft, a yoke member, a shifter spool vertically slidable on and rotatably driven by said drive shaft, a pivotal connection between said shifter spool and an intermediate point on said yoke, open coil tension springs interconnected between the outer ends of said yoke member and said hinge members so that said hinge members may be yieldingly adjusted on said counterweight and wing pivot shaft, a shifter fork, an annular groove in said shifter spool of greater width than said shifter fork, a control lever connected to said shifter fork operable to axially shift said shifter spool and yoke member on said drive shaft, rotor blades pivotally mounted for swinging movement about vertical axes on said hinge members, and a frictional restraint between said rotor blades and said hinge members.

References Cited in the file of this patent

UNITED STATES PATENTS

| Number | Name | Date |
|---|---|---|
| 2,256,635 | Young | Sept. 23, 1941 |
| 2,271,473 | Bennett | Jan. 27, 1942 |
| 2,368,698 | Young | Feb. 6, 1945 |
| 2,510,006 | Young | May 30, 1950 |

FOREIGN PATENTS

| Number | Country | Date |
|---|---|---|
| 265,272 | Great Britain | Jan. 31, 1927 |
| 459,070 | Canada | Aug. 23, 1949 |